(12) United States Patent
Steckelberg et al.

(10) Patent No.: US 6,852,135 B2
(45) Date of Patent: Feb. 8, 2005

(54) WATER-SOLUBLE FIBER-REACTIVE COLORANTS, METHOD FOR THE PRODUCTION THEREOF, AND USE THEIR USE

(75) Inventors: Joachim Steckelberg, Brunsbüttel (DE); Hermann Henk, Köln (DE)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 73 days.

(21) Appl. No.: 10/312,900

(22) PCT Filed: Jul. 14, 2001

(86) PCT No.: PCT/EP01/08151

§ 371 (c)(1),
(2), (4) Date: Feb. 6, 2003

(87) PCT Pub. No.: WO02/08342

PCT Pub. Date: Jan. 31, 2002

(65) Prior Publication Data

US 2003/0191294 A1 Oct. 9, 2003

(30) Foreign Application Priority Data

Jul. 22, 2000 (DE) .......................... 100 35 805

(51) Int. Cl.[7] ...................... C09B 62/095; C09B 62/515
(52) U.S. Cl. .......................... 8/549; 534/582; 534/602; 534/617; 534/619; 534/622; 534/625; 534/632; 534/633; 534/637; 8/685
(58) Field of Search ...................... 8/549, 685; 534/582, 534/602, 617, 619, 622, 625, 632, 633, 637, 624

(56) References Cited

U.S. PATENT DOCUMENTS 4,772,687 A * 9/1988 Henk

FOREIGN PATENT DOCUMENTS

DE 3516667 5/1986

* cited by examiner

Primary Examiner—Margaret Einsmann

(74) *Attorney, Agent, or Firm*—Connolly Bove Lodge & Hutz LLP

(57) ABSTRACT

Dyes of the general formula (1):

where M is hydrogen, alkali, ammonium or the equivalent of an alkaline earth metal ion, X is halogen, alkoxy or an N-containing heterocycle, Q is a grouping of the formula (e) where Y is vinyl or an alkali-eliminable grouping and W is alkyl which may be interrupted by an O or an NR group and the radicals $R^1$ and $R^2$ represent alkyl, alkoxy, alkylcarbonylamino, arylcarbonylamino, and also the radicals $R^3$ and $R^4$ are alkyl or hydrogen, their preparation and their use for dyeing and printing hydroxyl- and/or carboxamido-containing material, preferably fiber material.

14 Claims, No Drawings

WATER-SOLUBLE FIBER-REACTIVE COLORANTS, METHOD FOR THE PRODUCTION THEREOF, AND USE THEIR USE

The invention relates to the field of fiber-reactive azo dyes.

DE-A-3516667 describes green to olive metal complex dyes for use as reactive dyes for cotton, wool or nylon. However, they have certain application defects, for example an excessive dependence of the color yield on varying parameters in the dyeing process, or an inadequate or unlevel build-up on cotton, good build-up resulting from the ability of a dye to provide a stronger dyeing when used in a higher dye concentration in the dyebath. Moreover, these dyes exhibit unsatisfactory fixation yields, i.e., the portion of dye permanently fixed on the material to be dyed is too low, especially at low temperatures, and also unsatisfactory washfastnesses.

However, it is important, for ecological and economic reasons, to provide dyes having particularly high fixation yields in order that the portion of unfixed dye in the dyehouse effluent may be minimized. Moreover, dyes should always provide uniformly strong dyeings, ideally regardless of changing dyeing parameters, for example the dyeing temperature in the dyeing process. Furthermore, washfastness requirements are more stringent these days.

The present invention now provides dyes of the general formula (1) which surprisingly afford distinctly superior washfastnesses. Moreover, these dyes have higher fixation yields and a distinctly lower parameter dependence in dyeing. They are therefore also more compatible with other dyes which fix at distinctly lower temperatures.

The invention accordingly provides dyes of the general formula (1):

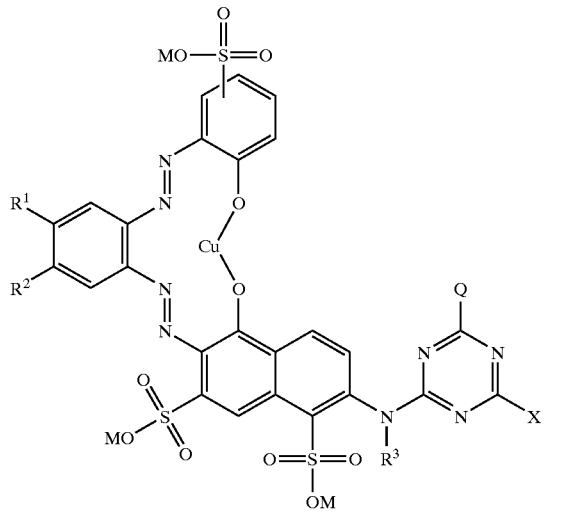

(1)

where

M is hydrogen, alkali, ammonium or the equivalent of an alkaline earth metal ion, X is halogen, for example fluorine or chlorine, $C_1$–$C_4$ alkoxy, for example methoxy or ethoxy, amino, a 5- or 6-membered nitrogen heterocycle of the formula (a), (b) (c) or (d)

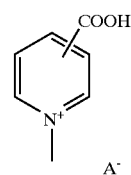

(a)

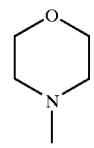

(b)

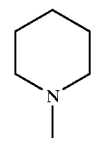

(c)

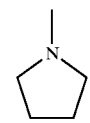

(d)

where when X is a group of the formula (a)

A- is fluoride, chloride or the equivalent of a sulfate ion and n is 1 or 2;

or X is unsubstituted or sulfo- or hydroxyl-mono- or -disubstituted anilino, an alkylamino or N,N-dialkylamino with $C_1$–$C_4$-alkyl, for example N,N-dimethylamino, or N,N-diethylamino, preferably chloro or fluoro $R^1$ is $C_1$–$C_6$ alkyl, such as methyl, ethyl, n-propyl, i-propyl, n-butyl, i-butyl, sec-butyl, tert-butyl, pentyl, hexyl, $C_1$–$C_6$-alkoxy, such as methoxy, ethoxy, propyloxy, butyloxy, chlorine, $C_1$–$C_4$-alkylcarbonylamino, for example methylcarbonylamino, ethylcarbonylamino, propylcarbonylamino, butylcarbonylamino, arylcarbonylamino, for example phenylcarbonylamino, and preferably is methoxy;

$R^2$ has any meaning of $R^1$ and is preferably methoxy or else $R^1$ and $R^2$ combine to form a ring of the formula (f) or (g):

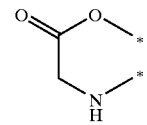

(f)

(g)

$R^3$ is $C_1$–$C_6$-alkyl, such as methyl, ethyl, n-propyl, i-propyl, n-butyl, i-butyl, sec-butyl, tert-butyl, pentyl, hexyl or hydrogen and is preferably hydrogen Q is a grouping of the formula (e)

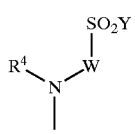

(e)

where
R⁴ has any meaning of R₃ or is phenyl which may be substituted by chlorine or sulfo and is preferably methyl or hydrogen;
W is a $C_nH_{2n}$-alkylene group where n is 2 to 6, which may be interrupted by 1 or 2 oxygen atoms or an $NR^5$ group, and is preferably ethylene, propylene, 3-oxapentyl, $R^5$ has any meaning of $R^3$ or is phenyl, preferably methyl, or else when X is fluorine or chlorine, Q can be a group of the formula (a), (b), (c) or (d), preferably Q is a radical of the formula (b) or (a), particularly preferably Q is a grouping of the formula (e);
Y is vinyl or is a grouping of the formula $CH_2CH_2Z$ wherein Z is an alkali-eliminable group, for example chloro, acetyl, phosphato, quaternary nitrogen group and is particularly preferably sulfato.

The dyes of the invention can be present as a preparation in solid or in liquid (dissolved) form. In solid form, they generally include the electrolyte salts customary for water-soluble and especially for fiber-reactive dyes, such as sodium chloride, potassium chloride and sodium sulfate, and may further include the auxiliaries customary in commercial dyes, such as buffer substances capable of setting a pH in aqueous solution between 3 and 7, such as sodium acetate, sodium borate, sodium bicarbonate, sodium dihydrogenphosphate, sodium tricitrate and disodium hydrogen-phosphate, or small amounts of siccatives; if they are present in a liquid, aqueous solution (including the presence of thickeners of the type customary in print pastes), they may also include substances which ensure a long life for these preparations, for example mold preventatives.

In general, the dyes of the invention are present as dye powders containing 10 to 80% by weight, based on the dye powder or the preparation, of an electrolyte salt which is also referred to as a standardizing agent. These dye powders may additionally include the aforementioned buffer substances in a total amount of up to 10% by weight, based on the dye powder. If the dyes of the invention are present in aqueous solution, the total dye content of these aqueous solutions will be up to about 50% by weight, for example between 5 and 50% by weight, and the electrolyte salt content of these aqueous solutions will preferably be below 10% by weight, based on the aqueous solution; the aqueous solutions (liquid preparations) may include the aforementioned buffer substances in an amount which is generally up to 10% by weight, preferably up to 2% by weight.

The dyes of the invention can be prepared in a conventional manner, for example by means of the customary diazotization, coupling and coppering reactions and conversion reactions with a trihalotriazine component followed by an introduction of Q by substitution of halogen, where Q is as defined above, using appropriate mixtures of such components in a manner familiar to one skilled in the art and using the required proportions.

A useful process comprises for example starting from a compound of the formula (1a) by diazotization with sodium nitrite in aqueous hydrochloric acid and subsequent coupling onto a compound of the formula (1b) to prepare a dye of the formula 1(c)

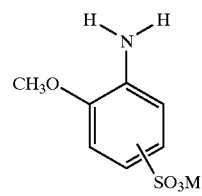

(1a)

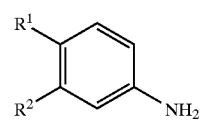

(1b)

and further diazotization with sodium nitrite in a hydrochloric acid medium and coupling of the resultant compound

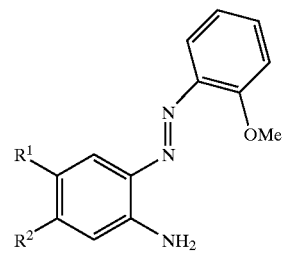

(1c)

onto an $R^3$—N-substituted 5-hydroxy-1,7-disulfo-2-naphthylamine to form a compound of the formula (1d)

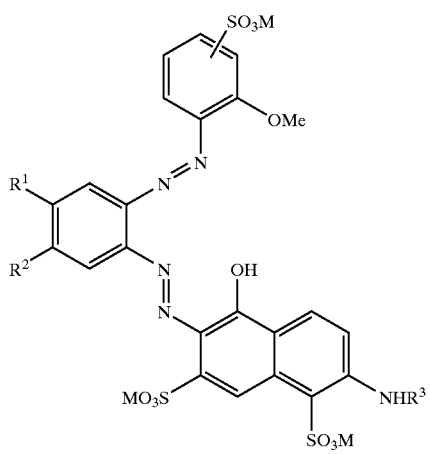

(1d)

which is converted by reaction with copper sulfate pentahydrate and ammonia at 80 to 100° C. to obtain a chromophore of the formula (1e)

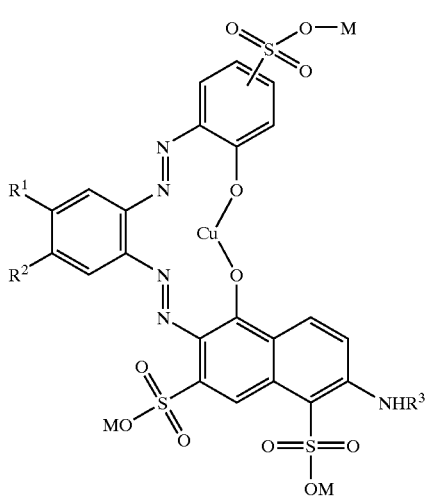

(1e)

which is reacted with a trihalotriazine at 0° C. in a neutral medium and subsequent reaction of the resultant dihalotriazinylbisazo compound (1f)

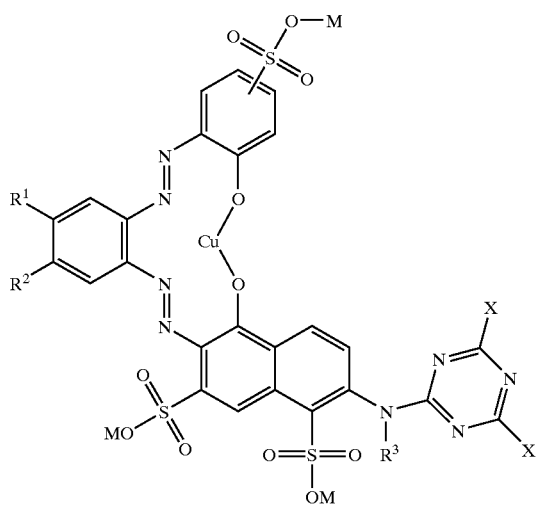

(1f)

with Q—H, where Q is as defined above, to form the compound (1) of the invention.

The separation from their synthesis solution of the compounds of the formula (I) according to the invention can be effected according to generally known methods for water-soluble compounds, for example either by precipitating from the reaction medium by means of electrolytes, for example sodium chloride or potassium chloride, or by evaporating the reaction solution itself for example by spray drying. In the latter case it is frequently advisable first to precipitate any sulfate in the solution as calcium sulfate and remove it by filtration.

The dyes of the invention have useful application properties. They are used for dyeing or printing hydroxyl- and/or carboxamido-containing materials, for example in the form of sheetlike structures, such as paper and leather or of films, for example composed of polyamide, or in bulk, as for example of polyamide and polyurethane, but especially for dyeing or printing these materials in fiber form. Similarly, the assynthesized solutions of the dye mixtures of the invention, if appropriate after addition of a buffer substance and if appropriate after concentrating or diluting, can be used directly as liquid preparation for dyeing.

The present invention thus also relates to the use of the dyes of the invention for dyeing or printing these materials, or rather to processes for dyeing or printing these materials in a conventional manner, by using dyes of the invention as colorant. The materials are preferably employed in the form of fiber materials, especially in the form of textile fibers, such as woven fabrics or yarns, as in the form of hanks or wound packages.

Hydroxyl-containing materials are those of natural or synthetic origin, for example cellulose fiber materials or their regenerated products and polyvinyl alcohols. Cellulose fiber materials are preferably cotton, but also other vegetable fibers, such as linen, hemp, jute and ramie fibers; regenerated cellulose fibers are for example staple viscose and filament viscose.

Carboxamido-containing materials are for example synthetic and natural polyamides and polyurethanes, especially in the form of fibers, for example wool and other animal hairs, silk, leather, nylon-6,6, nylon-6, nylon-11 and nylon-4.

The dyes of the invention can be applied to and fixed on the substrates mentioned, especially the fiber materials mentioned, by the application techniques known for water-soluble dyes, especially fiber-reactive dyes.

For instance, on cellulose fibers they produce by the exhaust method from a long liquor using various acid-binding agents and optionally neutral salts, such as sodium chloride or sodium sulfate, dyeings having very good wash-fastness. Application is preferably from an aqueous bath at temperatures between 40 and 105° C., optionally at a temperature of up to 130° C. under superatmospheric pressure, and optionally in the presence of customary dyeing auxiliaries. One possible procedure is to introduce the material into the warm bath and to gradually heat the bath to the desired dyeing temperature and to complete the dyeing process at that temperature. The neutral salts which accelerate the exhaustion of the dyes may also, if desired, only be added to the bath after the actual dyeing temperature has been reached.

The padding process likewise provides excellent color yields and very good color build-up on cellulose fibers, the dyes being allowed to become fixed on the material by batching at room temperature or at elevated temperature, for example at up to 60° C., by steaming or using dry heat in a conventional manner.

Similarly, the customary printing processes for cellulose fibers, which can be carried out either single-phase, for example by printing with a print paste comprising sodium bicarbonate or some other acid-binding agent and by subsequent steaming at 100 to 103° C., or two-phase, for example by printing with a neutral or weakly acidic print color and subsequent fixation either by passing the printed material through a hot electrolyte-comprising alkaline bath or by overpadding with an alkaline electrolyte-comprising padding liquor with subsequent batching of the alkali-overpadded material or subsequent steaming or subsequent treatment with dry heat, produce strong prints with well-defined contours and a clear white ground. The appearance of the prints is not greatly affected by variations in the fixing conditions.

When fixing by means of dry heat in accordance with the customary thermofix processes, hot air from 120 to 200° C. is used. In addition to the customary steam at 101 to 103° C. it is also possible to use superheated steam and high-pressure steam at temperatures of up to 160° C.

The acid-binding agents which effect the fixation of the dyes of the invention on the cellulose fibers include for example water-soluble basic salts of the alkali metals and likewise alkaline earth metals of inorganic or organic acids or compounds which liberate alkali in the heat. Especially suitable are the alkali metal hydroxides and alkali metal salts of weak to medium inorganic or organic acids, the preferred alkali metal compounds being the sodium and potassium compounds. Such acid-binding agents include for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, waterglass or trisodium phosphate.

The cellulose dyeings obtained following the customary aftertreatment by rinsing to remove unfixed dye portions exhibit very good dye properties and provide by the application and fixing methods customary in the art for fiber-reactive dyes strong olive dyeings and prints having very good fastness properties, especially very good wash-, light-, alkali-, acid-, water-, seawater-, perspiration- and rubfastnesses, on the materials mentioned in the description, such as cellulose fiber materials, especially cotton and viscose. The dyeings are further notable for their high degree of fixation and good build-up on cellulose materials. Of particular advantage is the good washfastness of the dyeings, the high fixation value and the low temperature dependence compared with the prior art.

Furthermore, the dyes of the invention can also be used for the fiber-reactive dyeing of wool. Moreover, wool which has been given a nonfelting or low-felting finish (cf. for example H. Rath, Lehrbuch derTextilchemie, Springer-Verlag, 3rd Edition (1972), p. 295–299, especially the finish by the Hercosett process (p. 298); J. Soc. Dyers and Colourists 1972, 93–99, and 1975, 33–44) can be dyed with very good fastness properties.

The process of dyeing on wool is here carried out in a conventional manner from an acidic medium. For instance, acetic acid and/or ammonium sulfate or acetic acid and ammonium acetate or sodium acetate may be added to the dyebath to obtain the desired pH. To obtain a dyeing of acceptable levelness, it is advisable to add a customary leveling agent, for example on the basis of a reaction product of cyanuric chloride with 3 times the molar amount of an aminobenzenesulfonic acid and/or of an aminonaphthalene-sulfonic acid or on the basis of a reaction product of for example stearylamine with ethylene oxide. For instance, the dyes of the invention are preferably subjected to the exhaust process initially from an acidic dyebath having a pH of about 3.5 to 5.5 under pH control and the pH is then, toward the end of the dyeing time, shifted into the neutral and optionally weakly alkaline range up to a pH of 8.5 to bring about, especially for very deep dyeings, the full reactive bond between the dyes of the invention and the fiber. At the same time, the dye portion not reactively bound is removed.

The procedure described herein also applies to the production of dyeings on fiber materials composed of other natural polyamides or of synthetic polyamides and polyurethanes. In general, the material to be dyed is introduced into the bath at a temperature of about 40° C., agitated therein for some time, the dyebath is then adjusted to the desired weakly acidic, preferably weakly acetic acid, pH and the actual dyeing is carried out at a temperature between 60 and 98° C. However, the dyeings can also be carried out at the boil or in sealed dyeing apparatus at temperatures of up to 106° C. Since the water solubility of the dyes of the invention is very good, they can also be used with advantage in customary continuous dyeing processes. The dyes of the invention dye the materials mentioned in green to olive shades.

The examples hereinbelow serve to illustrate the invention. Parts and percentages are by weight, unless otherwise stated. The compounds described in the examples in terms of a formula are partly indicated in the form of free acids; in general these compounds are prepared and isolated in the form of their salts, preferably sodium or potassium salts, and used for dyeing in the form of their salts. The starting compounds mentioned in the following examples, especially table examples, can similarly be used in the synthesis in the form of the free acid or in the form of their salts, preferably alkali metal salts, such as sodium or potassium salts.

EXAMPLE 1 a) 20.3 parts of 3-amino-4-methoxybenzenesulfonic acid are dissolved in 100 parts of water under neutral conditions and admixed with 30 parts of concentrated hydrochloric acid and 30 parts of ice. 6.9 parts of sodium nitrite in 100 parts of water are added with stirring and subsequently stirred in for 60 minutes. Excess nitrite is destroyed with amidosulfonic acid. 15.3 parts of 3,4-dimethoxyaniline are added and the pH is adjusted to 4.0 with 10% sodium carbonate solution for 2 hours. The precipitated dye is filtered off with suction.

b) The dye prepared under a) is dissolved under neutral ocnditions, admixed with 6.9 parts of sodium nitrite and added dropwise with thorough stirring to a mixture of 30 parts of ice and 50 parts of concentrated hydrochloric acid. This is followed by 15 minutes of stirring when excess nitrite is destroyed with amidosulfonic acid. 31 parts of 5-hydroxy-1,7-disulfo-2-naphthylamine are added and the batch is slowly adjusted to pH 5 with 10% sodium carbonate solution.

c) The reaction solution obtained in b) is admixed with 25 parts of copper sulfate pentahydrate and a complexing agent, for example ammonia, and heated at 80–100° C. for 1–3 hours. The dye is subsequently isolated by salt additon at room temperature. This provides the chromophore (A):

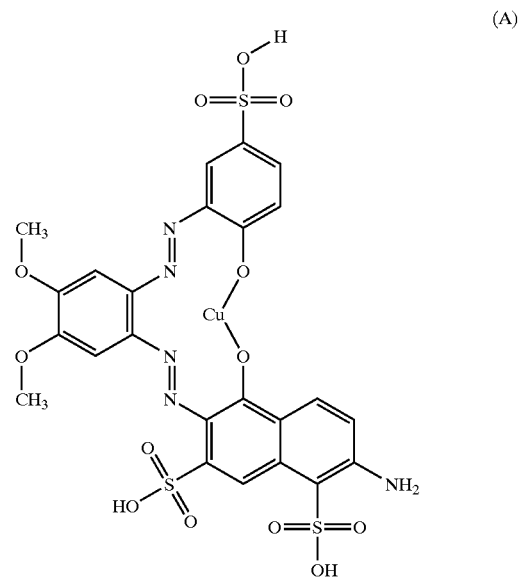

(A) may also be prepared in a similar manner by use of 3-amino-4-chlorobenzenesulfonic acid.

d) The chromophore (A) prepared under c) is dissolved under neutral conditions and admixed with 13.5 parts of trifluorotriazine at 0° C. with thorough stirring. The resultant compound (B) is admixed after 10 minutes with a solution of 15 parts of N-methyl-N-(2-β-sulfatoethylsulfonyl)ethylamine while the pH is maintained with sodium bicarbonate solution, and the reaction mixture is allowed to warm to room temperature. Salt is added to isolate the inventive dye (C):

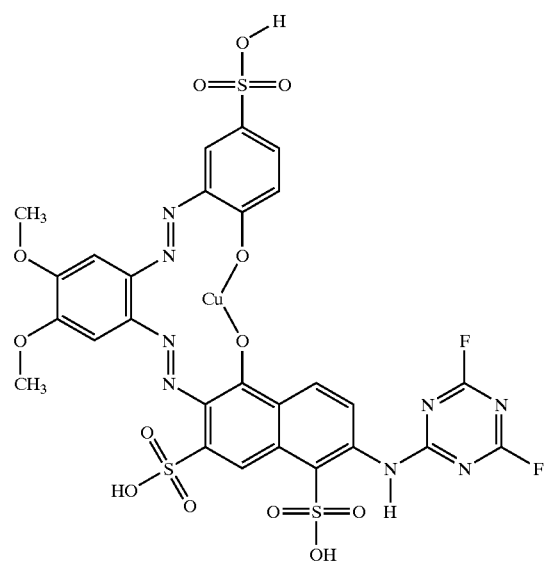

EXAMPLE 2

Chromophore (A) is dissolved in 100 parts of water under neutral conditions and reacted with 18.5 g of trichlorotriazine at 20–40° C. to form compound (B). The pH of the reaction mixture is maintained by addition of 10% sodium carbonate solution. This is followed by the addition of 18 parts of amine (D):

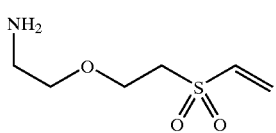

The dye solution is concentrated by membrane desalination and spray dried. This provides the following dye (E):

EXAMPLE 3

Use of 3-methoxy-4-aminosulfonic acid in example 1a and 3-methoxy-4-chloroaniline in example 1b provides the analogous dye (F):

EXAMPLE 4

Dye (C) is dissolved under neutral conditions and admixed with nicotinic acid. This provides dye (G):

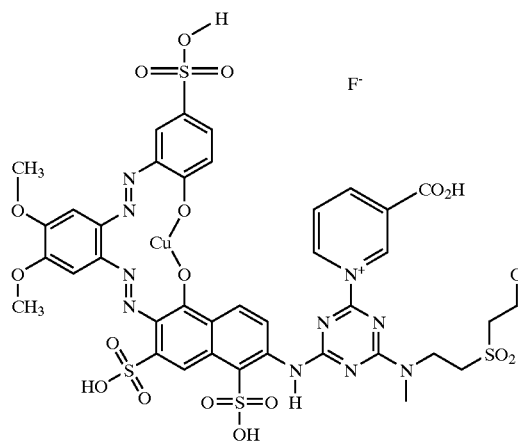

EXAMPLE 5

The difluorotriazine compound (B) is admixed with 9 parts of morpholine and warmed to room temperature at pH 7.20% by weight of salt is added to isolate dye (H) by filtration.

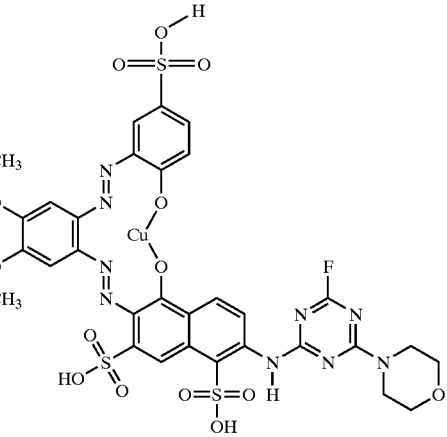

The table which follows describes further dyes according to the invention which can be prepared on the lines of the above examples:

| Example | Dye |
|---|---|
| 6 | |

| Example | Dye |
|---|---|
| 7 | 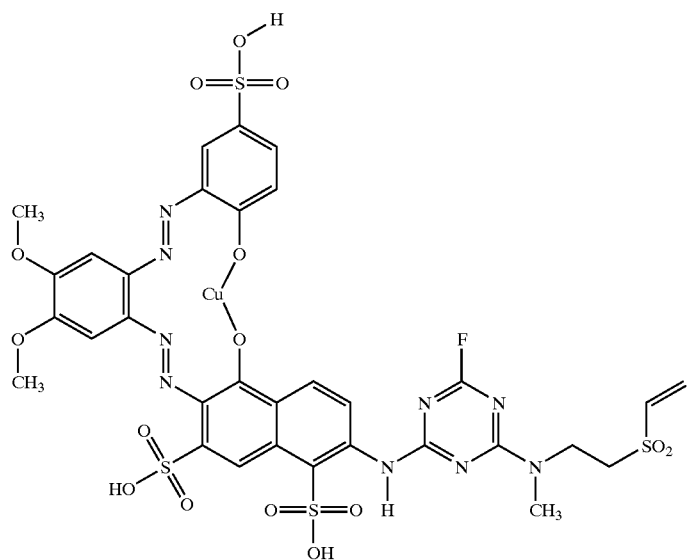 |
| 8 | 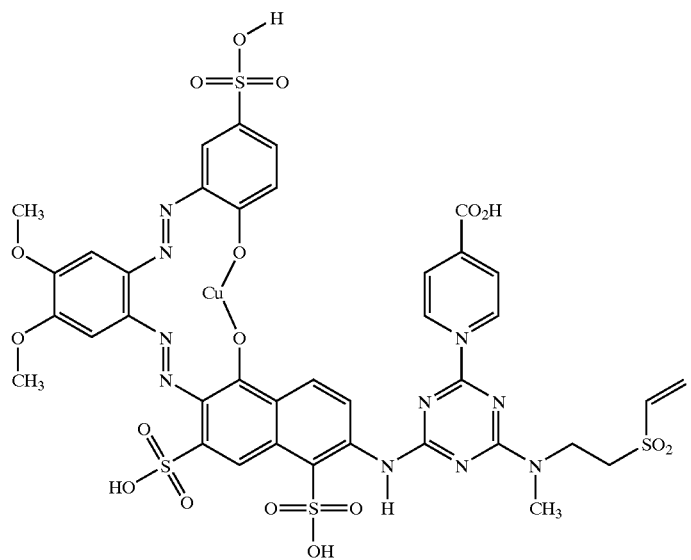 |

-continued
| Example | Dye |
|---|---|
| 9 | 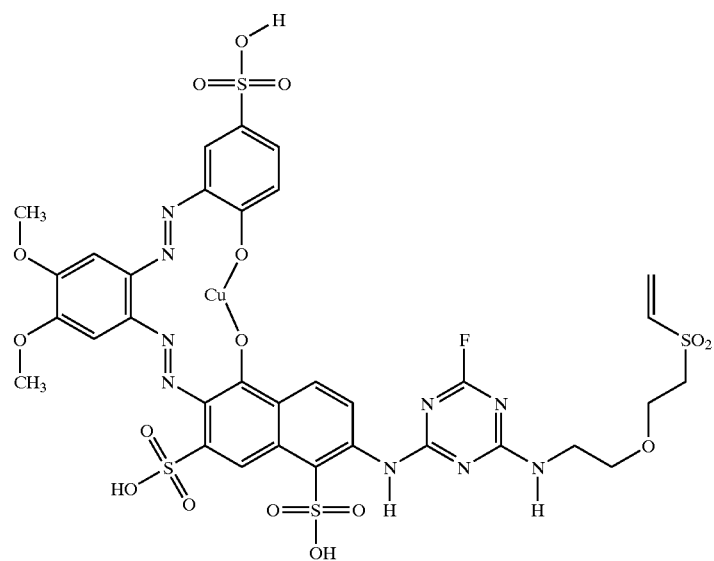 |
| 10 | 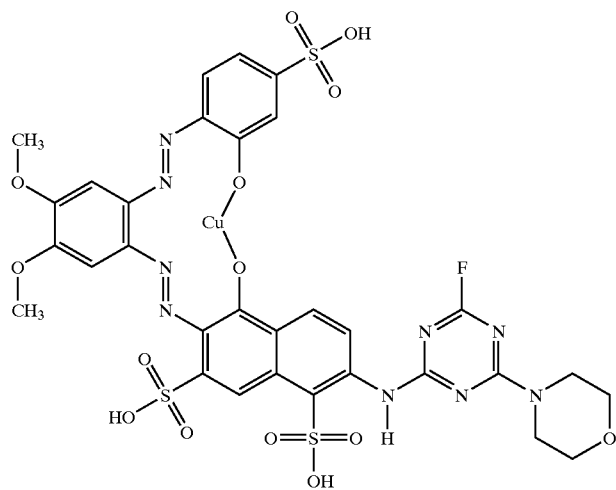 |

-continued
| Example | Dye |
|---|---|
| 11 | 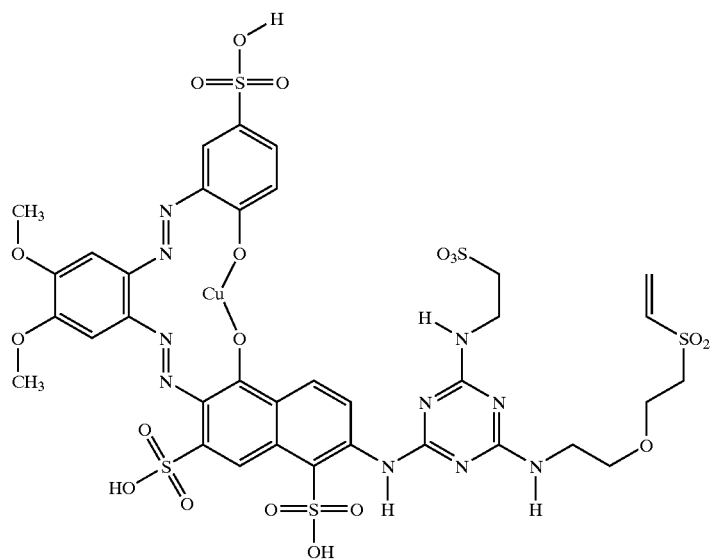 |
| 12 | 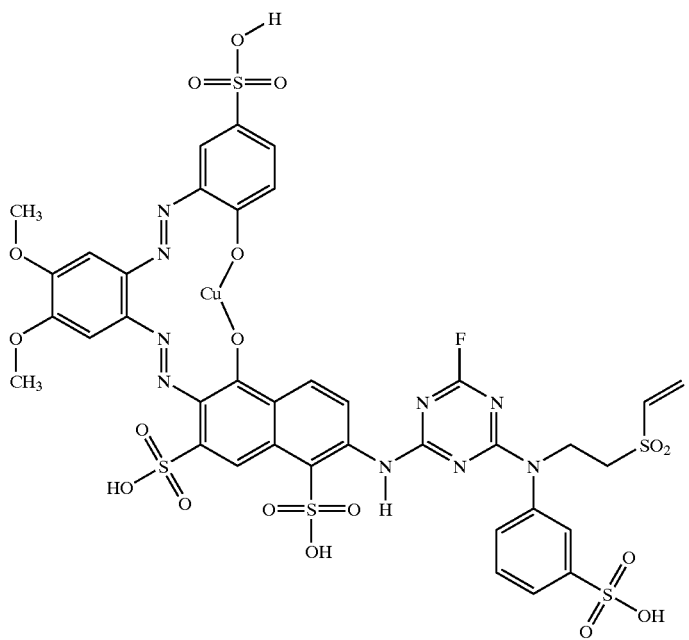 |

-continued
| Example | Dye |
|---|---|
| 13 | 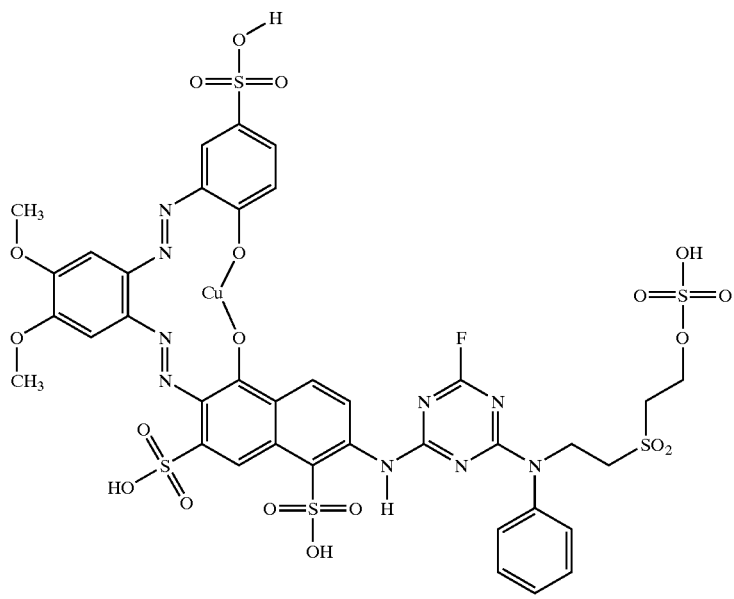 |
| 14 | 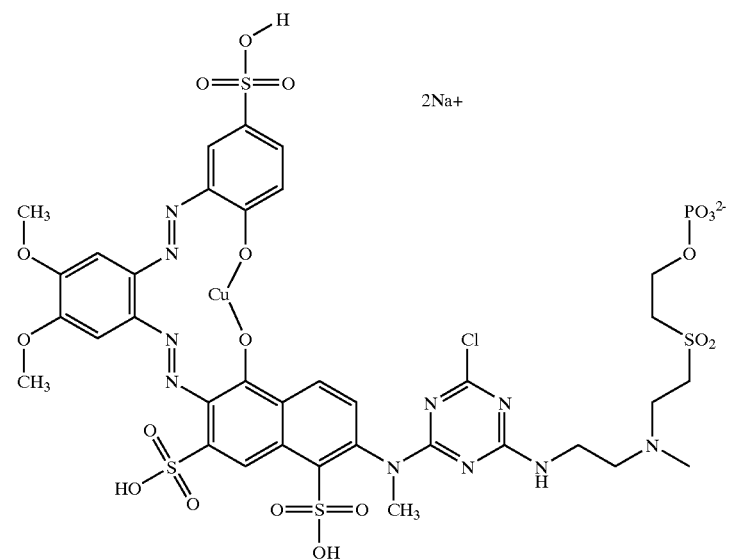 |

| Example | Dye |
|---|---|
| 15 | (structure of dye 15: copper complex azo dye with benzodioxane, sulfonated phenyl, naphthalene disulfonic acid, and fluorotriazine linked to 2-(sulfatoethylsulfonyl)ethylamino group) |
| 16 | (structure of dye 16: copper complex azo dye with chloro-methyl phenyl, sulfonated phenyl, naphthalene disulfonic acid, and chlorotriazine linked to 2-(sulfatoethylsulfonyl)ethylamino group) |

EXAMPLE 17

4 parts of the dye of example 2 are dissolved in 200 parts of water. 20 parts of sodium chloride, 5 parts of aqueous sodium hydroxide solution and 20 parts of cotton fabric are added and heated to 60° C. in a dyeing machine over 20 min. Dyeing is carried out at 60° C. for 45 min. The cotton fabric is subsequently rinsed with water and dilute acetic acid and dried. This provides an olive green dyeing having very good washfastness.

What is claimed is:

1. A dye of the general formula (1):

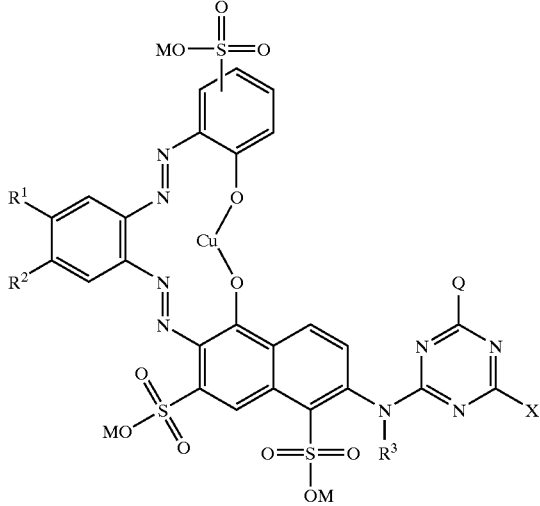

wherein
M is hydrogen, alkali, ammonium or the equivalent of an alkaline earth metal ion,
X is halogen, $C_1$–$C_4$ alkoxy, amino, a 5- or 6-membered nitrogen heterocycle of the formula (a), (b), (c) or (d)

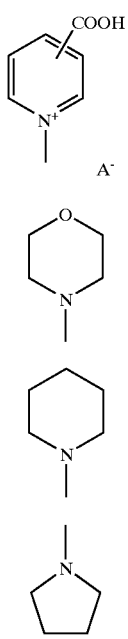

wherein when X is a group of the formula (a)
A- is fluoride, chloride or the equivalent of a sulfate ion and
n is 1 or 2;
or X is unsubstituted or sulfo- or hydroxyl-mono- or -disubstituted anilino, an alkylamino or N,N-dialkylamino with $C_1$–$C_4$-alkyl,
$R^1$ is $C_1$–$C_6$ alkyl, $C_1$–$C_6$-alkoxy, chlorine, $C_1$–$C_4$-alkylcarbonylamino or arylcarbonylamino;
$R^2$ has any meaning of $R^1$ or else $R^1$ and $R^2$ combine to form a ring of the formula (f) or (g):

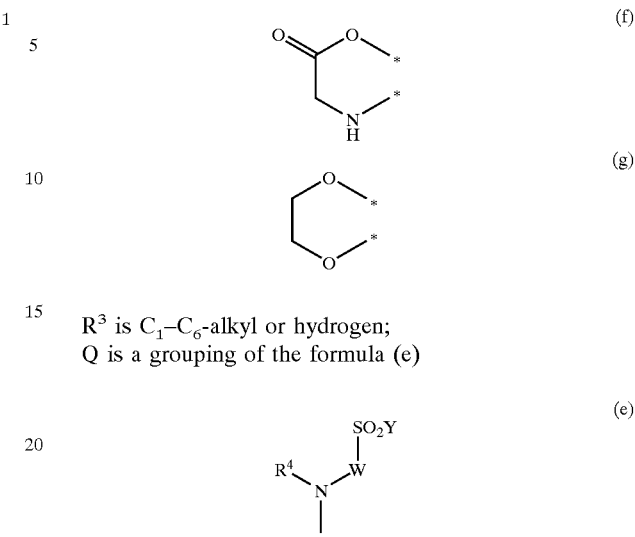

$R^3$ is $C_1$–$C_6$-alkyl or hydrogen;
Q is a grouping of the formula (e)

wherein
$R^4$ has any meaning of $R^3$ or is phenyl which is optionally substituted by chlorine or sulfo;
W is a $C_nH_{2n}$-alkylene group wherein n is 2 to 6, which is optionally interrupted by 1 or 2 oxygen atoms or an $NR^5$ group, wherein
$R^5$ has any meaning of $R^3$ or is phenyl, or else when X is fluorine or chlorine, Q can be a group of the formula (a), (b), (c) or (d),
Y is vinyl or is a grouping of the formula $CH_2CH_2Z$ wherein
Z is an alkali-eliminable group.

2. The dye as claimed in claim 1 wherein
X is fluorine, chlorine, methoxy, ethoxy N,N-dimethylamino or N,N-diethylamino,
$R^1$ is methyl, ethyl, n-propyl, i-propyl, n-butyl, i-butyl, sec-butyl, tert-butyl, pentyl, hexyl, methoxy, ethoxy, propyloxy, butyloxy, methylcarbonylamino, ethylcarbonylamino, propylcarbonylamino, butylcarbonylamino or phenylcarbonylamino;
$R^3$ methyl, ethyl, n-propyl, i-propyl, n-butyl, i-butyl, sec-butyl, tert-butyl, pentyl or hexyl; and
Z is chloro, acetyl, phosphato, quaternary nitrogen group or sulfato.

3. The dye as claimed in claim 1, wherein X is chloro or fluoro.

4. The dye as claimed in claim 1, wherein Y is ethenyl or β-sulfatoethyl.

5. The dye as claimed in claim 3, wherein Y is ethenyl or β-sulfatoethyl.

6. The dye as claimed in claim 1, wherein $R^1$ and $R^2$ are each methoxy.

7. The dye as claimed in claim 5, wherein $R^1$ and $R^2$ are each methoxy.

8. The dye as claimed in claim 1, wherein W is ethylene, propylene or 3-oxapentyl.

9. The dye as claimed in claim 7, wherein W is ethylene, propylene or 3-oxapentyl.

10. The dye as claimed in claim 1, wherein $R^3$ is hydrogen and $R^4$ is hydrogen or methyl.

11. The dye as claimed in claim 9, wherein $R^3$ is hydrogen and $R^4$ is hydrogen or methyl.

12. A process for preparing the dye as claimed in claim 1, which comprises starting from a compound of the formula (1a)

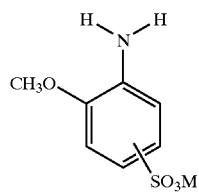

(1a)

by diazotization with sodium nitrite in aqueous hydrochloric acid and subsequent coupling onto a compound of the formula (1b)

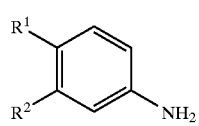

(1b)

to prepare a dye of the formula (1c)

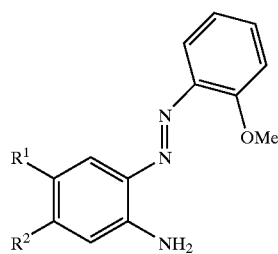

(1c)

and further diazotization and coupling of the resultant compound onto an $R^3$—N-substituted 5-hydroxy-1,7-disulfo-2-naphthylamine to form a compound of the formula (1d)

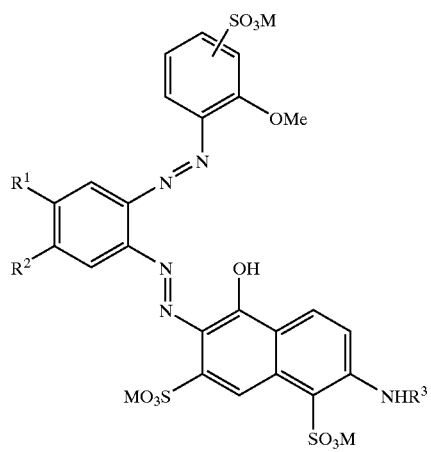

(1d)

which is converted by reaction with copper sulfate pentahydrate and ammonia at 80 to 100° C. to obtain a chromophore of the formula (1e)

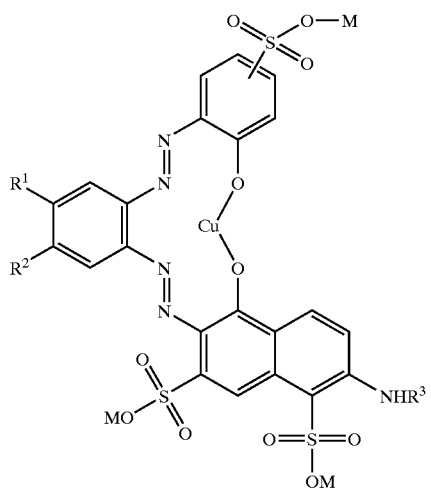

(1e)

which is reacted with a trihalotriazine and subsequent reaction of the resultant dihalotriazinylbisazo compound (1f)

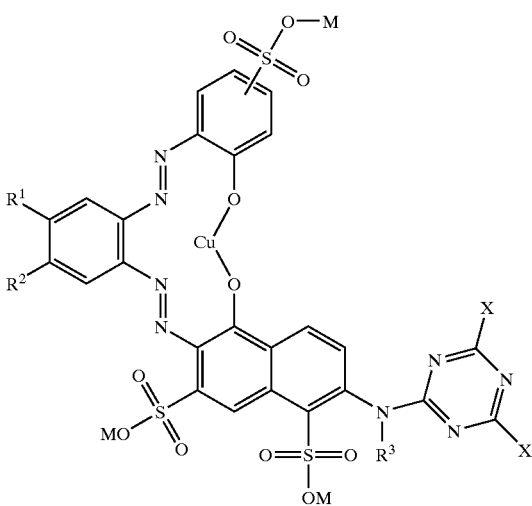

(1f)

with Q—H, where Q is as defined above, to form the compound (1).

13. A process for dyeing or printing hydroxyl- and/or carboxamido-containing material which comprises applying one or more dyes as claimed in claim 1 in dissolved form to the material and fixing the dye or dyes on the material by (a) means of heat, (h) by means of an alkali or (c) means of heat and an alkali.

14. The process as claimed in claim 13, wherein the material is a fiber material.

* * * * *

UNITED STATES PATENT AND TRADEMARK OFFICE
CERTIFICATE OF CORRECTION

PATENT NO. : 6,852,135 B2  
DATED : February 8, 2005  
INVENTOR(S) : Joachim Steckelberg et al.

It is certified that error appears in the above-identified patent and that said Letters Patent is hereby corrected as shown below:

Title page,  
Item [30], Foreign Application Priority Data, "100 35 805" should read -- 100 35 805.5 --.

Column 1,  
Lines 32-38, 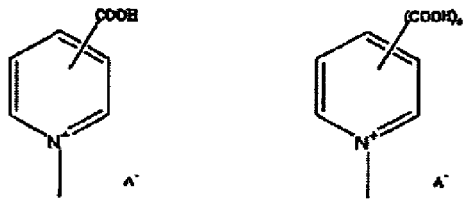 should read.

Column 25,  
Line 59, "100 °C." should read -- 100 °C --.

Signed and Sealed this

Fourteenth Day of June, 2005

JON W. DUDAS  
*Director of the United States Patent and Trademark Office*